United States Patent [19]

Vanderspurt

[11] 4,072,727
[45] Feb. 7, 1978

[54] SILVER-CADMIUM-ZINC ALLOY CATALYST FOR HYDROGENATION OF ACROLEIN TO ALLYL ALCOHOL

[75] Inventor: Thomas H. Vanderspurt, Gillette, N.J.

[73] Assignee: Celanese Corporation, New York, N.Y.

[21] Appl. No.: 714,057

[22] Filed: Aug. 13, 1976

[51] Int. Cl.$^2$ .................. C07C 29/14; B01J 23/60
[52] U.S. Cl. .................... 260/638 B; 252/457; 252/463; 252/475
[58] Field of Search .................. 260/638 B; 252/475, 252/463, 457

[56] References Cited

U.S. PATENT DOCUMENTS

| 2,763,696 | 9/1956 | Finch et al. | 260/638 B |
| 3,363,982 | 1/1968 | Baumgartner et al. | 252/475 |

*Primary Examiner*—Joseph E. Evans

[57] ABSTRACT

This invention provides a silver-cadmium-zinc alloy catalyst which is highly selective for hydrogenation of $\alpha,\beta$-unsaturated carbonyl compounds to the corresponding $\alpha,\beta$-unsaturated alcohol derivatives. Acrolein is hydrogenated to allyl alcohol in 70 percent yield at 100 percent conversion.

10 Claims, No Drawings

SILVER-CADMIUM-ZINC ALLOY CATALYST FOR HYDROGENATION OF ACROLEIN TO ALLYL ALCOHOL

BACKGROUND OF THE INVENTION

Several methods are known in the prior art for converting α,β-olefinically unsaturated carbonylic compounds into the corresponding α,β-olefinically unsaturated alcohols, and various selective catalysts are provided for improved conversion and yields.

British Pat. No. 734,247 and U.S. Pat. No. 2,763,696 disclose a process whereby acrolein may be converted to allyl alcohol by means of a vapor phase hydrogenation process. According to this process, moderate yields of allyl alcohol are obtained when acrolein is treated with free hydrogen in the vapor phase at a temperature between 210° C and 240° C in the presence of a catalyst comprising cadmium and one or more heavy metals of groups I, II, VI and VIII of the periodic table. Relatively high pressures are employed in the process on the order of 20 to 50 kilograms per square centimeter.

German Pat. No. 858,247 discloses a somewhat different process which is also useful for the conversion of acrolein to allyl alcohol. According to the German patent, good yields of allyl alcohol are obtained by reacting acrolein with free hydrogen in the presence of a catalyst containing cadmium oxide and a metal hydrogenating component which is preferably copper. The patent teaches that the best results are obtained when the process is operated at high temperatures and at high pressures on the order of 100–300 atmospheres.

It is known to convert α,β-unsaturated aldehydes into the corresponding unsaturated alcohols in the liquid phase by means of hydrogenation in the presence of a mixture of a copper soap and cadium soap. It is assumed that the copper salt is the catalyst and that the cadmium salt only serves the function of preventing the copper salt from being reduced to metallic copper. The use of a solution of a mixture of a copper salt and a cadmium salt for catalyst has the disadvantage that the system is extremely unstable under the required processing conditions, and fluctuations in conditions can cause reduction of the $Cd^{2+}$ salt and/or the $Cu^{2+}$ salt to metals.

U.S. Pat. No. 3,686,333 describes a liquid phase hydrogenation process for converting alkenals into alkenols in the presence of a catalyst mixture of a cadmium salt of a fatty acid and a transition metal salt of a fatty acid.

Japanese Pat. No. 73-01,361 discloses a process for hydrogenating α,β-olefinically unsaturated aldehydes into the corresponding allylic alcohol derivatives. The efficiency of the process is improved by the recycle of by-products to the hydrogenation zone, or by passage of the by-products stream into a second hydrogenation zone. The preferred catalysts are mixtures of cadmium and copper, cadmium and silver, cadmium and zinc, cadmium and chromium, copper and chromium, and the like. The Japanese patent discloses that under steady state conditions 1.5 moles/hour of acrolein are converted to 1.05 moles/hour of allyl alcohol and 0.4 mole/hour of n-propanol.

There remains a need for a commercially feasible vapor phase process for converting α,β-olefinically unsaturated carbonylic compounds into allylic derivatives in higher efficiency and yield then has been achieved heretofore in the prior art, and a need for an improved catalyst to facilitate the achievement of the commercially feasible hydrogenation process.

Accordingly, it is an object of the present invention to provide a novel silver-cadmium-zinc alloy catalyst for selective hydrogenation of α,β-olefinically unsaturated carbonylic compounds to the corresponding allylic derivatives.

It is another object of the present invention to provide an improved process for producing allylic alcohol derivatives by hydrogenation of α,β-olefinically unsaturated carbonylic compounds.

It a further object of the present invention to provide a process for converting acrolein into allyl alcohol with a conversion of at least 95 percent and a yield of at least 70 percent.

Other objects and advantages of the present invention shall become apparent from the following description and examples.

DESCRIPTION OF THE INVENTION

One or more objects of the present invention are accomplished by the provision of a novel catalyst composition which consists essentially of a silver-cadmium-zinc alloy on a carrier substrate, wherein the atomic ratio of silver to cadmium in the alloy is in the range of between about 0.1 and 3 to 1, and the zinc is contained in the alloy in a quantity between about 0.001 and 30 weight percent, based on the total weight of alloy.

The carrier substrate can be selected from silica, Celite, diatomaceous earth, kieselguhr, alumina, silica-alumina, titanium oxide, pumice, carborundum, boria, and the like. It is highly preferred that the silver-cadmium-zinc alloy be supported on a silica and/or alumina carrier substrate. The quantity of carrier substrate in the catalyst composition can vary in the range of between about 5 and 99.5 weight percent, based on the total catalyst weight.

The preferred catalysts are prepared by coprecipitating hydroxides of silver, cadmium and zinc from an aqueous solution of calculated quantities of water-soluble salts of silver, cadmium and zinc. The precipitation is effected by the addition of caustic to the aqueous solution.

The carrier substrate component of the catalyst composition can be incorporated during the catalyst preparation by slurrying the finely divided carrier substrate mass in the said aqueous medium immediately after the silver-cadmium-zinc hydroxides are precipitated. Finely divided porous material such as fumed silica or diatomaceous earth are highly preferred carrier substrate materials for the preparation of the present invention catalysts.

After the coprecipitation of silver-cadmium-zinc hydroxides has been accomplished, the solids phase is recovered by filtration or other conventional means. The filtered solids are washed with chloride-free water until essentially neutral. For the purposes of a fixed bed operation, the dried filter cake preparation is calcined at a temperature between about 175° C and 300° C for a period of about 2 to 20 or more hours, and then the calcined material is ground and pelleted. Prior to use the catalyst pellets can be reduced in a stream of hydrogen at a temperature between about 50° C and 250° C for a period of about 5 hours. For a fluidized bed operation, the calcined catalyst preparation can be ground and sized in a conventional manner to satisfy process design requirements. The reduction of the catalyst can also be accomplished in situ during a vapor phase hydrogenation process.

There are several critical aspects of catalyst preparation which must be respected in order to achieve a novel type of hydrogenation catalyst having unique and advantageous properties in comparison to prior art catalysts for selective hydrogenation of acrolein type compounds to allyl alcohol type compounds.

Firstly, the silver-cadmium-zinc alloy in the catalyst must contain an atomic ratio of silver to cadmium in the range between about 0.1 and 3 to 1, and preferably between about 0.4 and 2.2 to 1; and the silver-cadmium-zinc alloy must contain between about 0.001 and 30 weight percent zinc, and preferably between about 0.01 and 15 weight percent zinc, based on the total weight of alloy.

Secondly, the silver, cadmium and zinc in the catalyst must be in the free metal state, and must be substantially in the form of an alloy i.e., X-ray diffraction spectra should confirm the absence of unalloyed silver, cadmium or zinc crystals. Preferred silver-cadmium-zinc alloy catalysts are solid solutions which nominally exhibit an X-ray diffraction pattern which is substantially free of detectable unalloyed metal crystallite lines.

In terms of X-ray diffraction data as more fully described hereinbelow, a preferred silver-cadmium-zinc alloy catalyst can consist substantially of $\alpha$-phase silver-cadmium-zinc without detectable splitting of X-ray diffraction lines which is indicative of silver-rich and/or cadmium-rich and/or zinc-rich crystallites. Silver-cadmium-zinc catalysts which also have outstanding selectivity for high yield conversion of acrolein-type compounds into allyl alcohol-type compounds are those in which the alloy composition consists of more than about 50 percent of $\gamma$-phase silver-cadmium-zinc crystallites as characterized by X-ray diffraction pattern.

Another preferred silver-cadmium-zinc alloy catalyst composition can have $\alpha,\gamma$ and $\epsilon$-phase crystallites present. Those especially rich in $\epsilon$-phase, while very highly selective, are somewhat less active than those rich in the nonsplit $\alpha$-phase alloy.

Thirdly, it has been found that the production of silver-cadmium-zinc alloy catalysts, which exhibit the greatest selectivity for converting acrolein to allyl alcohol, can be achieved if the coprecipitation step of the catalyst preparation is conducted within restricted limitations and under controlled conditions. Thus, the total concentration of the water-soluble salts (e.g., nitrate salts) in the aqueous solution should be maintained in the range between about 5 weight percent and the solubility limit of the salts, and the quantity of caustic added as a precipitating agent should approximate the stoichiometric amount within narrow limits. It is particularly advantageous to employ a water-soluble hydroxide (e.g., an alkali metal hydroxide) as the caustic precipitating agent, and to add the caustic rapidly with vigorous stirring to facilitate formation of a precipitate of fine crystals or gel. Excellent results are obtained, for example, if 34 grams of silver nitrate, 30 grams of cadmium nitrate, and 0.5 gram of zinc acetate are dissolved in 100 milliliters of water, and 22.4 grams of potassium hydroxide are dissolved in 200 milliliters of water, and both solutions are added rapidly and simultaneously to 100 milliliters of water with vigorous stirring.

Other precautions must be observed during catalyst preparation if highly selective silver-cadmium-zinc alloy compositions are to be achieved. It has been found that the calcination step of the catalyst preparation most advantageously must be conducted within narrowly controlled limitations. The calcination step should be accomplished at a temperature between about 175° C and 300° C, and most preferably at a temperature between about 200° C and 250° C. If calcination of silver-cadmium-zinc alloy catalyst is conducted at a temperature above about 300° C, it has been found that the resultant catalyst exhibits less selectivity for high yield conversion of acrolein to allyl alcohol in a vapor phase process.

The importance of controlled calcination conditions is apparent from a comparison of the data presented in the Examples hereinbelow with the data reported in Example VII of U.S. Pat. No. 2,763,696. In the said patent Example VII, over a silver-cadmium catalyst acrolein is hydrogenated in vapor phase to allyl alcohol in a yield of 38.3% at a conversion rate of 95%. This is in contrast to the results reported hereinbelow. In Example I inter alia, acrolein is converted to allyl alcohol in a yield of 74% at a conversion rate of 99.9%. The low selectivity of the U.S. Pat. No. 2,763,696 catalyst is believed to be attributable to the presence of a substantial quantity of unalloyed silver crystallites. The patent catalyst is calcined at 400° C for 2–6 hours during the preparation procedure. High calcination temperatures can have the effect of segregating the active metal species into large crystallites of substantially unalloyed silver and substantially unalloyed cadmium. The presence of unalloyed silver and/or cadmium is detrimental to the hydrogenation selectivity characteristics of silver-cadmium-zinc catalysts.

It has also been found that the silver-cadmium-zinc alloy catalysts of the present invention are most effective when supported on a carrier substrate, i.e., in combination with an internal diluent. Catalysts prepared without a carrier substrate hve been found to have a lower activity and shorter catalyst life than the corresponding supported catalysts in vapor phase hydrogenation processes. A typical carrier substrate will have an initial surface area of more than about 1–10m$^2$/gm, and an average pore diameter greater than about 20 A. A high proportion of small pores is detrimental to catalyst activity, if the size of the pores are such that capillary condensation of an acrolein-type compound occurs and causes pore blockage. This results in loss of catalytic activity.

The desired supported silver-cadmium-zinc alloys catalysts can be achieved by introducing a calculated quantity of silver, cadmium and zinc complexes or salts in solution into the pores of a support such as silica or controlled pore size glass. The amount of each and the total concentration is adjusted so as to achieve the desired metal ratios and the total percent by weight alloy. The solvent is then removed in a manner conducive to the intimate codeposition of the silver, cadmium and zinc complexes or salts on the interior surfaces of the pores. After solvent removal, the support with its adsorbed metal salts or complexes is then subjected alternately to degassing and reducing conditions by exposure at elevated temperatures to vacuum then to a low pressure stream of a reducing gas for several cycles. The support alloy then formed is allowed to cool under a reducing atmosphere and stored in a relatively oxygen-free environment until usage. X-ray diffraction techniques are conveniently employed to verify that the desired alloy formation is complete.

In copending patent application [Attorney's Docket CEL-76-14], incorporated herein by reference, the preparation of silver-cadmium alloy catalysts and their use in selective hydrogenation of acrolein-type compounds into allyl alcohol-type compounds are described. The present invention silver-cadmium-zinc alloy catalysts generally exhibit superior selectivity and yield of allyl alcohol from acrolein in comparison to silver-cadmium alloy catalysts not containing a metallic zinc constituent. The high yields are observed over a broad range of acrolein conversion rates, and within a relatively short contact time. This is illustrated in Example IV below, where yields of 71-78 weight percent are reported for acrolein conversion rates over the range of 14-99.7 weight percent. A present invention silver-cadmium-zinc alloy catalyst is suitable for a commercial scale conversion of acrolein to allyl alcohol, in which high yield of allyl alcohol is achieved and unreacted acrolein is recycled.

Other objects of the present invention are accomplished by the provision of an improved hydrogenation process for converting α,β-olefinically unsaturated carbonylic compound into the corresponding allylic alcohol derivative which comprises reacting an α,β-olefinically unsaturated carbonylic compound with hydrogen in the vapor phase at a temperature between about 0° C and 300° C and a pressure between about 15 and 15000 psi in the presence of a catalyst comprising a coprecipitated silver-cadmium-zinc alloy on a carrier substrate, wherein the atomic ratio of silver to cadmium in the alloy is in the range between about 0.1 and 3 to 1, and the zinc is contained in the alloy in a quantity between about 0.001 and 30 weight percent, based on the total weight of alloy.

The α,β-olefinically unsaturated carbonylic compounds amenable to the present invention process include those which correspond to the formula:

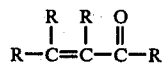

wherein R is a substituent selected from hydrogen and hydrocarbon radicals containing between one and about 10 carbon atoms. A preferred class of α,β-olefinically unsaturated compounds corresponding to the above formula are those in which R is a substituent selected from hydrogen and alkyl groups containing between one and about four carbon atoms.

Illustrative of α,β-olefinically unsaturated compounds which can be selectively hydrogenated in accordance with the invention process are acrolein, methacrolein, crotonaldehyde, tiglic aldehyde, α-ethylacrolein, cinnamaldehyde, 2-hexenal, methylvinyl ketone, methylisopropenyl ketone, ethylvinyl ketone, cyclohexenylisopropenyl ketone, and the like. Heteroatoms such as halogen and nitrogen may also be present in the compounds being selectively hydrogenated to allylic derivatives.

In the practice of the invention process, the α,β-olefinically unsaturated carbonylic compound and hydrogen at elevated temperature and pressure are passed in vapor phase through a reaction zone containing a novel silver-cadmium-zinc alloy catalyst having exceptional selective hydrogenation activity.

The reaction temperature of the hydrogenation process can vary in the range between about 0° C and 300° C, and preferably between about 75° C and 250° C, and most preferably between about 100° C and 215° C.

The pressure of the hydrogenation process can vary in the range between about 15 and 15000 psi, and preferably between about 75 and 5000 psi, and most preferably between about 250 and 2500 psi.

The mole ratio of hydrogen to α,β-olefinically unsaturated carbonylic compound in the vapor phase feed stream can vary in the range between about 1:1 and 1000:1. For the selective hydrogenation of an aldehydic compound such as a acrolein, the preferred mole ratio of hydrogen to carbonylic compound in the feed stream is in the range between about 5:1 and 200:1, and the most preferred mole ratio in the range between about 10:1 and 150:1.

The rate at which the vapor phase gas stream is contacted with the silver-cadmium-zinc alloy catalyst is not critical, and can be varied consonant with the other processing conditions to achieve an optimal balance of conversion and yield parameters. The flow rate of feed gas reactants can vary over a broad range between about a total of 10 moles and 1000 moles of feed gas reactants per liter of catalyst per hour. In the case of acrolein and methylvinyl ketone and other low molecular weight carbonylic compounds, a preferred flow-rate of feed gas reactants is one which provides a catalyst contact time between about 0.1 and 50 seconds. By the invention process, acrolein can be converted to allyl alcohol with a space-time yield of greater than 900 grams per liter of catalyst per hour.

The process can be conducted either by passing the feed mixture through a fixed catalyst bed, or through a reactor wherein the catalyst is present in finely divided form and is maintained in a fluidized state by the upward passage therethrough of the gaseous reactants. The process is most conveniently carried out in a continuous manner, although intermittent types of operation can be employed. In a preferred method of continuous operation, the components of the feed stream are brought together and under the desired pressure are passed in vapor phase through the catalyst heated to the desired temperature. The reaction zone advantageously is an elongated tube or tubes containing the catalyst. The feed can be brought into contact with the catalyst in either the unheated or preheated condition. The effluent from the reactor can then be separated into its various constituents by conventional means, the most convenient of which is that of fractional distillation. If desired, any unconverted portion of the carbonylic reactant present in the effluent can be recirculated through the catalyst in the reactor, preferably admixed with fresh feed gases.

The following examples are further illustrative of the present invention. The reactions and other specific ingredients are presented as being typical, and various modifications can be derived in view of the foregoing disclosure within the scope of the invention.

The X-ray diffraction photographs were obtained on a Philips XRG-3000 constant potential, constant milliampere X-ray generator, using Ni filtered CuK radiation, 35 KV and 20 MA. The diffraction photographs were prepared from the catalyst samples after a slight mortar treatment using Philips Debye-Scherrer Powder Cameras of 114.6 mm diameter, with 0.3 mm diameter thin walled glass capillaries for the samples and a film illuminator and measuring device for measurement of the diffraction lines. Ilford industrial X-ray film type G was used for the photographs.

The X-ray diffraction identification of Ag, CdO and AgCd is in accordance with Astrand and Westgreen, Z. anorg. Allg. Chemie, 175, 90(1928). The crystal planes are 111, 200, 220, 311, etc. Phase diagrams of AgCd, AgZn, CdZn, and the like, are published in "Constitution of Binary Alloys" by Max Hansen (2nd Edition, McGraw Hill, New York, NY, 1958)

| | |
|---|---|
| Ag | 2.36(100), 2.04(38), 1.445(25), 1.23(26), 1.18(13). |
| α-AgCd | Values are usually slightly higher than Ag to 2.41A etc. The slight changes in spacings are quite visible visually, especially when the back reflection scattering can also be seen, i.e., 2.36 to 2.41 A for 111. |
| γ-AgCd | $a_o$ from 9.935 to 9.982 A is complex body centered system, thus calculation yields the spacing ranges. The spacings actually are quite close to those of Ag. 2.34–2.35, 2.03–2.04, 1.43–1.44, 1.23, 1.18–1.19 A; however there are spacings at 1.66–1.67 and 1.35–1.36 A which are not present in Ag. $a_o$ from 3.040 to 3.095 A, $c_o$ const at 4.810 A. |
| ε-AgCd | hexagonal system. With ε-AgCd essentially every line visible in the spectra can be covered. There is a distinction however, i.e., spacings at 2.65, 2.41, 2.31 A allow distinction from Ag and γ-AgCd. |
| CdO | 2.71(100), 2.35(88), 1.66(43), 1.42(28), 1.36(13), 1.05(13), 0.96(11). |

EXAMPLE I

Two solutions were prepared by dissolving 34 grams AgNO$_3$ (0.20 mole), 30 grams Cd(NO$_3$)$_2$·4H$_2$O (0.097 mole) and 0.10 gram Zn(CH$_3$COO)$_2$·2H$_2$O (0.00046 mole) in 100 milliliters of doubly distilled water, and 25.4 grams of 87.4% analytical reagent grade KOH (0.396 mole) in 100 milliliters of distilled water. Both solutions were rapidly and simultaneoulsy added to 100 milliliters of vigorously stirred doubly distilled water. Then 400 milliliters of additional water were added to suspend the gelatinous precipitate, and 1000 milliliters of Cabot Cab-O-Sil M-5 and sufficient water to maintain fluidity and adjust the total volume to 1800 milliliters were added. After 2 hours of further stirring at room temperature, the suspension was allowed to settle 24 hours in the dark at 4° C. The supernatant, with a pH of 6.5, was then decanted and the precipitate removed from the rest of the solution by vacuum filtration. The filter cake, after washing with 2000 milliliters of distilled water, was calcined in air at 250° C for 20 hours. The resulting solid was cooled to room temperature in a vacuum desiccator, and then crushed and sieved to yield a 50–80 mesh fraction. This composition analyzed as containing 53.7% SiO$_2$, 30.1% Ag, 14.5% Cd, 150 ppm Zn, and 0.4% K. Powder X-ray diffraction indicated that Ag, Cd(OH)$_2$ and 2 types of Cd$_2$O(OH)$_2$ crystallites exhibiting sharp diffraction lines were present.

About 6.5 grams of this material were placed in a 0.924 cm i.d. by 28 cm reactor tube. The tube was heated under 201 psig hydrogen flowing at 750 SCCM from 24° C to 133° C in the course of 30 minutes. At the end of the period, one part acrolein in 40 parts hydrogen replaced the pure hydrogen stream. Table I summarizes the reactor conditions and the resultant composition of the products collected in a trap held at −78° C and reactor pressure just down stream from the catalyst bed.

On powder X-ray diffraction examination the used catalyst exhibited broad lines at 2.36, 2.04, 1.44, 1.23 A with broad back reflection lines of medium intensity. These lines are ascribed to an α-phase silver-cadmium-zinc alloy with an average composition of 67.46% Ag, 32.51% Cd and 0.03% Zn on silica, although the form of the zinc is not definitely known.

TABLE I

| Mole Percent Acrolein In Feed | Catalyst Temp. ° C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 2.20 | 125 | 203 | 15.2 | 52 | 70 | 21 | 6 |
| 2.20 | 150 | 203 | 15.2 | 91 | 69 | 21 | 10 |
| 2.20 | 175 | 204 | 15.2 | 98 | 63 | 9 | 27 |
| 0.96 | 115 | 498 | 19.9 | 52 | 75 | 21 | 3 |
| 0.88 | 125 | 510 | 20.4 | 55 | 76 | 21 | 2 |
| 0.89 | 135 | 508 | 20.3 | 64 | 76 | 21 | 3 |
| 0.89 | 150 | 504 | 20.2 | 97 | 69 | 21 | 10 |
| 0.89 | 160 | 504 | 20.2 | 99 | 69 | 3 | 30 |

EXAMPLE II

Two solutions were prepared by dissolving 34 grams AgNO$_3$ (0.20 mole), 30 grams Cd(NO$_3$)$_2$·4H$_2$O (0.097 mole) and 0.50 gram Zn(CH$_3$COO)$_2$·2H$_2$O (0.0023 mole) in 100 milliliters of distilled water, and 25.6 grams of 87.4% analytical reagent grade KOH (0.399 mole) were dissolved in 100 milliliters of distilled water. Both solutions were rapidly and simultaneously added to 100 milliliters of vigorously stirred distilled water. After 400 milliliters of additional water were added to suspend the gelatinous precipitate, 100 milliliters of Cab-O-Sil M-5 and sufficient water to maintain fluidity and bring the total volume to 1800 milliliters were added. After 2 hours of further stirring at room temperature, the suspension was allowed to settle 24 hours in the dark at 4° C. The supernatant, with a pH of 6.5, was then decanted and the precipitate removed from the rest of the solution by vacuum filtration. The filter cake, after washing with 2000 milliliters of distilled water, was calcined in air at 250° C for 20 hours. The resulting solid was cooled to room temperature, and crushed and sieved to yield a 50–80 mesh fraction. This material by bulk analytical techniques contained 51.3% SiO$_2$, 20.8% Ag, 13.3% Cd, 210 ppm Zn, and 0.6% K. Powder X-ray diffraction indicated that Ag, Cd(OH)$_2$, and CdO crystallites exhibiting sharp diffraction lines were present.

About 3.36 grams were placed in 0.55 cm i.d. by 28 cm reactor tube. The reactor was heated under 209 psig hydrogen flowing at 750 SCCM from 23° C to 125° C in 30 minutes. After an additional six minutes, 1 part acrolein in 40 parts hydrogen replaced the pure hydrogen.

Table II summarizes various reactor conditions and the resultant compositon of the liquid products collected in a trap maintained at −78° C and reactor pressure. The used catalyst, by powder X-ray diffraction, had broad lines ascribed to the α-phase AgCd alloy on silica. These alloys had an average composition of 60.959% Ag, 38.797% Cd, 0.062% Zn. These were no direct evidence as to the form of the zinc, although under the hydrogenation conditions it was probable that the zinc had been reduced and hence alloyed with the silver-cadmium.

TABLE II

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.88 | 125 | 510 | 8.3 | 29.0 | 77 | 20 | 3 |
| 0.86 | 150 | 523 | 8.7 | 78.0 | 76 | 20 | 4 |
| 0.89 | 175 | 505 | 8.0 | 99.9 | 74 | 5 | 21 |

EXAMPLE III

Two solutions were prepared by dissolving 29.73 grams AgNO$_3$ (0.175 mole), 23.14 grams Cd(NO$_3$)$_2$·4H$_2$O (0.075 mole), and 14.87 grams Zn(NO$_3$)$_2$·6H$_2$O (0.050 mole) in 160 milliliters of distilled water, and 27.3 grams of 87.4% analytical reagent grade KOH (0.425 mole) in 160 milliliters distilled water. Both solutions were simultaneously added to 200 milliliters of vigorously stirred distilled water. About 500 milliliters of Cab-O-Sil M-5 were then added, along with sufficient additional water to maintain fluidity. The final volume was adjusted to 2000 milliliters by addition of distilled water, and the mixture was stirred at room temperature for an additional 2 hours. The precipitate was separated from the supernatant KNO$_3$ solution by vacuum filtration, and washed with 2000 milliliters of distilled water. After partially air drying for 18 hours, the filter cake was removed and placed in an oven and calcined in air at 250° C for 20 hours. The composition was crushed and sieved to yield a 50–80 mesh fraction. Chemical analysis indicated a content of 39.9% SiO$_2$, 35.8% Ag, 13.3% Cd, 5.3% Zn, and 0.3% K. On powder X-ray diffraction examination, weak sharp lines were observed at 2.35, 20.4, 1.44, and 1.23 A, with a very weak but sharp back reflection pattern. It was concluded that CdO and Ag crystallites were present. Zinc species were not specifically identified.

A 2.62 grams quantity of this material was placed in a 0.55 cm i.d. by 28 cm reactor tube. Over the course of 1 hour the temperature was increased from 18° C to 125° C under 198 psig hydrogen flowing at 750 SCCM. After this period 1 part acrolein in 40 parts hydrogen replaced the pure hydrogen stream. Table III summarizes various reactor conditions and the resultant composition of the liquid products collected in a trap held at −78° C and reactor pressure.

The used catalyst on powder X-ray diffraction examination had broad lines, indicative of α-phase AgCdZn alloy, at 2.36, 2.04, 1.44, and 1.23 A, with a very weak back reflection pattern. Chemical analysis indicated the presence of a 65.8% Ag, 24.4% Cd, 9.7% Zn alloy on the silica. ZnO, AgZn, and Zn lines were not observed.

TABLE III

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 2.20 | 125 | 204 | 6.5 | 52.0 | 67 | 23 | 9 |
| 2.20 | 150 | 206 | 6.6 | 75.0 | 69 | 26 | 5 |
| 2.20 | 175 | 201 | 6.4 | 99.4 | 70 | 10 | 20 |
| 0.92 | 125 | 490 | 8.4 | 74.9 | 73 | 18 | 9 |
| 0.92 | 150 | 490 | 8.4 | 99.8 | 72 | 3 | 25 |
| 0.91 | 160 | 493 | 7.9 | 100.0 | 70 | 0 | 30 |

EXAMPLE IV

Two solutions were prepared by dissolving 34.1 grams AgNO$_3$ (0.200 mole), 60.2 grams Cd(NO$_3$)$_2$·4H$_2$O (0.195 mole) and 4.0 grams Zn(NO$_3$)$_2$·6H$_2$O (0.0135 mole) in 100 milliliters of distilled water, and 39.70 grams 87.4% analytical reagent grade KOH (0.618 mole) in 100 milliliters of distilled water. The solutions were rapidly and simultaneously added to 200 milliliters of vigorously stirred distilled water. The volume was increased to 1000 milliliters with additional distilled water, and the suspension was stirred for 30 minutes. The pH of the supernatant phase was 6.5. About 500 milliliters of Cab-O-Sil M-5 were added along with sufficient water to maintain fluidity and to adjust the volume to 1800 milliliters. After 2 hours of stirring, vacuum filtration was used to form a filter cake which was washed with 2000 milliliters of distilled water. The material was calcined in air at 200° C for 65 hours, cooled in a vacuum desiccator to room temperature, and crushed and sieved to yield a 50–80 mesh fraction. The composition analyzed as containing 28.9% SiO$_2$, 36.7% Ag, 30.3% Cd, 1.2% Zn and 0.1% K. Powder X-ray diffraction examination indicated that CdO and some Ag crystallites were the principle species identifiable by medium-broad lines at 2.34, 2.04, 1.23 A with a broad but very weak back reflection pattern.

A 3.08 grams quantity of catalyst was charged into a 0.55 cm i.d. by 28 cm reactor tube. Under 490 psig hydrogen flowing at 1400 SCCM the catalyst was heated over the course of 48 minutes from 19° C to 125° C, at which point the hydrogen was changed to a stream of one part acrolein and 109 parts hydrogen. Table IV summarizes various reactor conditions and the resultant composition of the liquid products collected in a trap held at −78° C and reactor pressure.

The used catalyst on powder X-ray diffraction exhibited sharp lines at 2.41, 2.36, 2.09, 1.66, 1.48, 1.26 A. It appeared that principally γ and α with some ε-phase AgCdZn alloy was present on the silica. Chemical analysis indicated that these alloys had an average composition of 53.66% Ag, 44.59% Cd, and 1.75% Zn.

TABLE IV

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.92 | 125 | 488 | 8.4 | 14.0 | 76 | 19 | 3 |
| 0.91 | 150 | 495 | 8.5 | 12.0 | 78 | 21 | 1 |
| 0.90 | 175 | 500 | 8.6 | 61.0 | 75 | 18 | 4 |
| 0.90 | 180 | 500 | 8.6 | 97.8 | 76 | 8 | 16 |
| 0.89 | 185 | 504 | 8.6 | 99.7 | 71 | 5 | 23 |

EXAMPLE V

Two solutions were prepared by dissolving 33.97 grams $AgNO_3$ (0.20 mole) 92.54 grams $Cd(NO_3)_2 \cdot 4H_2O$ (0.300 mole) and 5.05 grams $Zn(NO_3)_2 \cdot 6H_2O$ (0.017 mole) in 100 milliliters of 99° C distilled water, and 53.79 grams of 87.0% analytical reagent grade KOH (0.834 mole) were dissolved in 100 milliliters of 99° C distilled water. Both solutions were rapidly and simultaneously added to vigorously stirred 99° C distilled water, followed by the addition of sufficient water to adjust the volume of the mixture to 1000 milliliters. After 30 minutes of stirring, the pH of the supernatant was 7.0. About 500 milliliters of Cab-O-Sil M-5 and sufficient water to maintain fluidity were added, and the volume was adjusted to 1800 milliliters with additional distilled water. The supernatant solution was removed by vacuum filtration, the the filter cake was washed with 3000 milliliters of distilled water. The material was calcined for 20 hours at 200° C in air, and crushed and sieved to yield a 50–80 mesh fraction. This material analyzed as containing 17.9% $SiO$, 28.9% Ag, 39.3% Cd and 1.3% Zn. Powder X-ray diffraction lines indicated Ag, CdO, $Cd(OH)_2$ and some zinc oxide phase were present.

A 6.07 gram quantity of the catalyst was charged to a reactor tube 0.925 cm i.d. by 28 cm long. With the catalyst under 500 psig hydrogen flowing at 1500 SCCM, the temperature of the reactor was increased from 20° C to 250° C, maintained at 250° C for 15 minutes, and then cooled to 125° C over a total period of 1.2 hours. After an additional several minutes, one part acrolein in 111 parts hydrogen was introduced in the reactor. Table V summarizes various reactor conditions and the resultant composition of the liquid products collected in a trap held at −78° C and reactor pressure. The used catalyst had mainly γ-phase and some α and ε-phase AgCdZn alloys present on the silica. The average alloy composition was 41.58% Ag, 56.55% Cd and 1.87% Zn.

EXAMPLE VI

Two solutions were prepared by dissolving 33.97 grams $AgNO_3$ (0.20 mole), 61.70 grams $Cd(NO_3)_2 \cdot 4H_2O$ (0.20 mole) and 5.95 grams $Zn(NO_3)_2 \cdot 6H_2O$ (0.020 mole) in 100 milliliters of distilled water, and 41.28 grams of 87.0 analytical reagent grade KOH in 100 milliliters of distilled water. Both solutions were added rapidly and simultaneously to 200 milliliters of 98° C vigorously stirred distilled water. The volume was then increased to 1000 milliliters with more water, and after 30 minutes of stirring the pH was 6.5. About 500 milliliters of Cab-O-Sil M-5 were added with sufficient water to maintain fluidity and to adjust the total volume to 1800 milliliters. The precipitate was separated from the supernatant by vacuum filtration. The filter cake was washed with 3000 milliliters of distilled water and calcined in air at 200° C for 20 hours. After cooling in a vacuum desiccator to room temperature, the catalyst precursor was crushed and screened to yield a 50–80 mesh fraction. Analysis indicated a bulk composition of 19.6% $SiO_2$, 33.7% Ag, 37.7% Cd and 1.9% Zn.

A 6.13 gram quantity of the composition was placed in a 0.925 cm i.d. by 28 cm reactor tube. With the catalyst precursor under 509 psig hydrogen flowing at 1500 SCCM, the temperature was increased from 19° C to 250° C, held at 250° C for 15 minutes, and cooled to 125° C over a total 1.4 hours. After several minutes, one part acrolein in 113 parts hydrogen was introduced. Table VI summarizes various reactor conditions and the resultant composition of the liquid products collected in a trap held at −78° C and reactor pressure. The used catalyst had a nitrogen BET surface area of 6.6 $m^2$/gram. Analysis indicated an average AgCdZn alloy composition of 45.98% Ag, 51.43% Cd, and 2.59% Zn on silica. Powder X-ray diffraction analysis indicates the presence of γ with α and ε-phase AgCdZn on $SiO_2$.

TABLE V

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.89 | 125 | 506 | 14.8 | 7.1 | 79.6 | 12.6 | 1.6 |
| 0.91 | 175 | 496 | 14.6 | 72.3 | 72.0 | 20.0 | 6.0 |

TABLE VI

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.89 | 125 | 505 | 16.7 | 5.9 | 80.6 | 15.3 | 4.1 |
| 0.88 | 150 | 510 | 16.9 | 26.5 | 74.5 | 19.9 | 2.6 |
| 0.88 | 165 | 511 | 16.9 | 85.6 | 73.0 | 17.2 | 7.9 |
| 0.89 | 175 | 504 | 16.7 | 99.9 | 69.9 | 8.2 | 19.5 |

EXAMPLE VII

Two solutions were prepared by dissolving 50.96 grams $AgNO_3$ (0.30 mole), 61.69 grams $Cd(NO_3)_2 \cdot 4H_2O$ (0.20 mole) and 5.95 grams $Zn(NO_3)_2 \cdot 6 H_2O$ (0.02 mole) in 100 milliliters of distilled water, and 47.73 grams of 87.0% analytical reagent grade KOH (0.74 mole) in 100 milliliters of distilled water. Both solutions were rapidly and simultaneously added to 200 milliliters of distilled water. The mixture after 30 minutes of stirring had a supernatant with a pH of 6.5. 500 milliliters of Cab-O-Sil M-5 was added with sufficient water to maintain fluidity and to adjust the total volume to 1800 milliliters. The precipitate was separated from the supernatant solution. This material was then calcined in air at 200° C for 20 hours, and crushed and sieved to yield a 50–80 mesh fraction. The composition contained 16.2% $SiO_2$, 43.1% Ag, 35.6% Cd, and 1.6% Zn.

A 6.80% gram quantity of this catalyst precursor were placed in a 0.925 cm i.d. by 29 cm reactor tube. With the catalyst precursor under 500 psig hydrogen (99.995%) flowing at 1500 SCCM, the reactor was heated from 19° C to 250° C for 15 minutes, and cooled to 125° C. One part acrolein in 112 parts hydrogen was then substituted for the hydrogen. Table VIII summarizes various reactor conditions and the resultant composition of the liquid products collected in a trap held at $-78°$ C and reactor pressure. The used catalyst had a nitrogen BET surface area of 32.4 m²/gram. Analysis indicated a AgCdZn alloy with an average composition of 53.7% Ag, 44.3% Cd, and 2.0% Zn on the silica, which on powder X-ray diffraction examination revealed α,γ and ε-phase lines.

99.999% $H_2$ readmitted to 2 psig, and held at 400° C for 1 hour. The pressure was reduced to $5 \times 10^{-5}$ torr and the tube was sealed with a torch. The tube was heated to 800° C for 1 hour and cooled. The resulting ingot was filed with a clean and degreased steel file to yield filings. These analyzed as containing 34.2% Ag, 27.0% Cd, and 41.4% Zn. On powder X-ray diffraction, the material was found to be a highly crystalline composition which was comprised of $AgZn_3$ and AgCd.

About 16.6 grams of these filings were treated with 2 liters of 4 normal KOH solution for 24 hours under a nitrogen atmosphere. The solution above the filings was then replaced by 2 liters of 6H KOH solution and refluxed for 72 hours under a nitrogen atmosphere. After cooling to room temperature, the metal composition was rinsed with distilled water until the pH of the rinse water was 6.5. The catalyst was placed in a 0.55 cm i.d. by 28 cm reactor tube. The volume of the catalyst bed was 2.5 cm³. The reactor was then placed under 500 psig hydrogen flowing at 1500 SCCM and the temperature raised from 23° C to 200° C, held at 200° C for 20 minutes, and cooled to 125° C. After an additional period of 6 minutes the 99.999% hydrogen was replaced by one part acrolein in 111 parts 99.995% hydrogen.

Table VIII summarizes various reactor conditions and the resultant composition of the liquid products collected in a trap held at $-78°$ C and reactor pressure.

The used catalyst had a surface area of 0.51 M²/gram and had a composition of 52.8% Ag, 48.4% Cd, and 1.1% Zn. No K was detected. Powder X-ray diffraction indicated that it was comprised mostly of γ-phase AgCdZn alloy with some α and ε-phase also present. A high degree of order was observed.

TABLE VII

| Mole Percent Acrolein In Feed | Catalyst Temp. ° C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.90 | 125 | 501 | 16.6 | 11.2 | 83.3 | 12.8 | 1.2 |
| 0.98 | 150 | 456 | 15.0 | 50.3 | 76.3 | 16.2 | 5.8 |
| 0.88 | 175 | 510 | 16.9 | 99.7 | 69.0 | 2.9 | 25.4 |

TABLE VIII

| Mole Percent Acrolein In Feed | Catalyst Temp ° C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.90 | 125 | 500 | 3.3 | 3.8 | 0 | 17 | 0[1] |
| 0.91 | 150 | 496 | 3.3 | 2.4 | 6 | 31 | 0[2] |
| 0.92 | 200 | 489 | 3.3 | 1.5 | 5 | 88 | 4[3] |

[1] 83% unidentified high boiling products
[2] 63% unidentified high boiling products
[3] 4% unidentified high boiling products

EXAMPLE VIII

This Example illustrates the low conversions and low yields obtained when a silver-cadmium-zinc alloy catalyst not in accordance with the present invention is not formed by coprecipitation of corresponding salts and does not include a carrier substrate.

A mixture of 16.5 grams 99.999% metallic zinc (200 mesh), 10.1 grams 99.999% silver needles (200 mesh) and 11.8 grams 99.999% cadmium powder (200 mesh) were introduced into a ½ inch O.D., Amersil TO8 quartz tube and pumped down to $5 \times 10^{-5}$ torr. Two psig 99.999% $H_2$ was introduced and the temperature increased to 400° C. The pressure was again reduced to $5 \times 10^{-5}$ torr, a fresh charge of 2 psig 99.999% $H_2$ admitted, the pressure again reduced to $10^{-4}$ torr,

EXAMPLE IX

This Example illustrates the conversion and yields obtained when a silver-cadmium-zinc alloy catalyst contains copper metal.

Two solutions were prepared by dissolving 34 grams $AgNO_3$ (0.20 mole), 30 grams $Cd(NO_3)_2 \cdot 4H_2O$ (0.97 mole), 0.10 grams $Zn(CH_3COO)_2 \cdot 2H_2O$ (0.00046 mole) and 0.10 grams $Cu(NO_3)_2 \cdot 3H_2O$ (0.00041 mole) in 100 milliliters of distilled water, and 25.45 grams of 87.4 analytical reagent grade KOH (0.3964 mole) in 100 milliliters of distilled water. Both solutions were added rapidly and simultaneously to 100 milliliters of vigorously stirred distilled water. The volume was then increased to 1000 milliliters with the addition of more water, and after one hour of stirring, the pH of the supernatant was found to be 6.5. About 1000 milliliters of Cab-O-Sil M-5 and sufficient water to adjust the total volume to 1800 milliliters were added. After 4 hours of stirring the precipitate was separated from the supernatant solution. The material was calcined in air at 250° C for 20 hours, and washed and sieved to yield at 20–80 mesh fraction. Bulk chemical analysis indicated that this material contained 52.8% $SiO_2$, 29.7% Ag, 12.7% Cd, 0.7% K, 370 ppm Cu and 550 ppm Zn. Powder X-ray diffraction examination revealed principally CdO.

A 7.45 gram quantity of this composition was changed to a 0.925 cm i.d. by 28 cm reactor tube. With the catalyst precursor under 485 psig hydrogen flowing in 1500 SCCM, the reactor tube was heated over the course of 1 hour from 21° to 125° C. The hydrogen flow was replaced with a stream of one part acrolein in 108 parts hydrogen.

Table IX summarizes various reactor conditions and the resultant composition of the liquid products collected in a trap held at −78° C and reactor pressure.

Power X-ray diffraction examination of the used catalyst revealed an α-phase AgCdCuZn alloy and a silver rich α-phase Ag,Cd(ZnCu) alloy on silica. Relatively board split lines were found at 2.37, 2.05, 1.45, 1.44, 1.24, 1.23 A, with a weak broad back reflection also showing splitting. The average composition, by bulk analysis techniques, was 69.90% Ag, 29.89% Cd, 0.12% Zn, 0.09% Cu.

TABLE IX

| Mole Percent Acrolein In Feed | Catalyst Temp. °C | Reactor Pressure psig | Contact Time sec. | Weight Percent Acrolein Conversion | Weight Percent Product Selectivity | | |
|---|---|---|---|---|---|---|---|
| | | | | | Allyl Alcohol | Propanal | Propanol |
| 0.92 | 125 | 491 | 9.8 | 77.3 | 67.0 | 17.1 | 14.1 |
| 0.92 | 150 | 488 | 9.7 | 97.3 | 67.6 | 10.6 | 21.4 |
| 0.89 | 160 | 506 | 10.0 | 99.7 | 42.7 | 8.4 | 48.7 |
| 0.89 | 175 | 503 | 10.0 | 100.0 | 10.1 | 0.2 | 89.2 |

What is claimed is:

1. A catalyst composition consisting essentially of a silver-cadmium-zinc alloy on a carrier substrate, wherein the atomic ratio of silver to cadmium in the alloy is in the range of between about 0.1 and 3 to 1, and the zinc is contained in the alloy in a quantity between about 0.001 and 30 weight percent, based on the total weight of alloy, and wherein the silver-cadmium-zinc alloy exhibits an X-ray diffraction pattern which is substantially free of detectable unalloyed metal crystallite lines.

2. A catalyst composition in accordance with claim 1 wherein the atomic ratio of silver to cadmium in the alloy is in the range of between about 0.4 and 2.2 to 1, and the zinc is contained in the alloy in a quantity between about 0.01 and 15 weight percent, based on the total weight of alloy.

3. A catalyst composition in accordance with claim 1 wherein the quantity of carrier substrate in the catalyst is in the range between about 5 and 99.5 weight percent, based on the total catalyst weight.

4. A catalyst composition in accordance with claim 1 wherein the carrier substrate is alumina.

5. A catalyst composition in accordance with claim 1 wherein the carrier substrate is silica.

6. A catalyst composition in accordance with claim 1 wherein the silver-cadmium-zinc alloy consists of more than about 50 percent γ-phase silver-cadmium-zinc crystallites.

7. A catalyst composition in accordance with claim 1 wherein the silver-cadmium-zinc alloy consists substantially of α-phase silver-cadmium-zinc alloy crystallites, and the X-ray diffraction pattern of the α-phase silver-cadmium-zinc alloy crystallites does not exhibit line splitting.

8. A catalyst composition in accordance with claim 1 wherein the silver-cadmium-zinc alloy consists essentially of α-phase, γ-phase and ε-phase silver-cadmium-zinc alloy crystallites, and the X-ray diffraction pattern of the α-phase silver-cadmium-zinc alloy crystallites does not exhibit line splitting.

9. A catalyst in accordance with claim 1 wherein the silver-cadmium-zinc alloy consists essentially of α-phase and γ-phase silver-cadmium-zinc alloy crystallites, and the X-ray diffraction pattern of the α-phase silver-cadmium zinc crystallites does not exhibit line splitting.

10. An improved hydrogenation process for converting acrolein into allyl alcohol which comprises reacting acrolein with hydrogen in the vapor phase at a temperature between about 0° C and 300° C and a pressure between about 15 and 15,000 psi in the presence of a silver-cadmium-zinc alloy on a carrier substrate, wherein the atomic ratio of silver to cadmium in the alloy is in the range of between about 0.1 and 3 to 1, and the zinc is contained in the alloy in a quantity between about 0.001 and 30 weight percent, based on the total weight of alloy, and wherein the silver-cadmium-zinc alloy exhibits an X-ray diffraction pattern which is substantially free of detectable unalloyed metal crystallite lines.

* * * * *